(No Model.)

B. McEVOY.
DISINFECTING APPARATUS.

No. 513,411.    Patented Jan. 23, 1894.

Witnesses
J. Edw. Maybee
W. G. McMillan

Inventor
Bernard McEvoy
by
Donald C. Ridout & Co.
Attys (No Model.) 2 Sheets—Sheet 2.

B. McEVOY.
DISINFECTING APPARATUS.

No. 513,411. Patented Jan. 23, 1894.

Witnesses
J. Edw. Maybee
W. G. McMillan

Inventor
Bernard McEvoy
by
Donald C. Ridout & Co.
atty

UNITED STATES PATENT OFFICE.

BERNARD McEVOY, OF TORONTO, CANADA.

DISINFECTING APPARATUS.

SPECIFICATION forming part of Letters Patent No. 513,411, dated January 23, 1894.

Application filed September 19, 1892. Serial No. 446,308. (No model.)

*To all whom it may concern:*

Be it known that I, BERNARD MCEVOY, of the city of Toronto, in the county of York, in the Province of Ontario, Canada, have invented a certain new and Improved Disinfecting Apparatus, of which the following is a specification.

The object of the invention is to design an apparatus in which clothing and all kinds of material may be readily and thoroughly disinfected, and it consists, essentially of a hermetically sealed vessel or chamber designed to contain the material to be disinfected and held at a high temperature and provided with means for exhausting the air from the said vessel, charging it with steam which is afterward exhausted; substantially as hereinafter more particularly explained and then definitely claimed.

Figure 1:
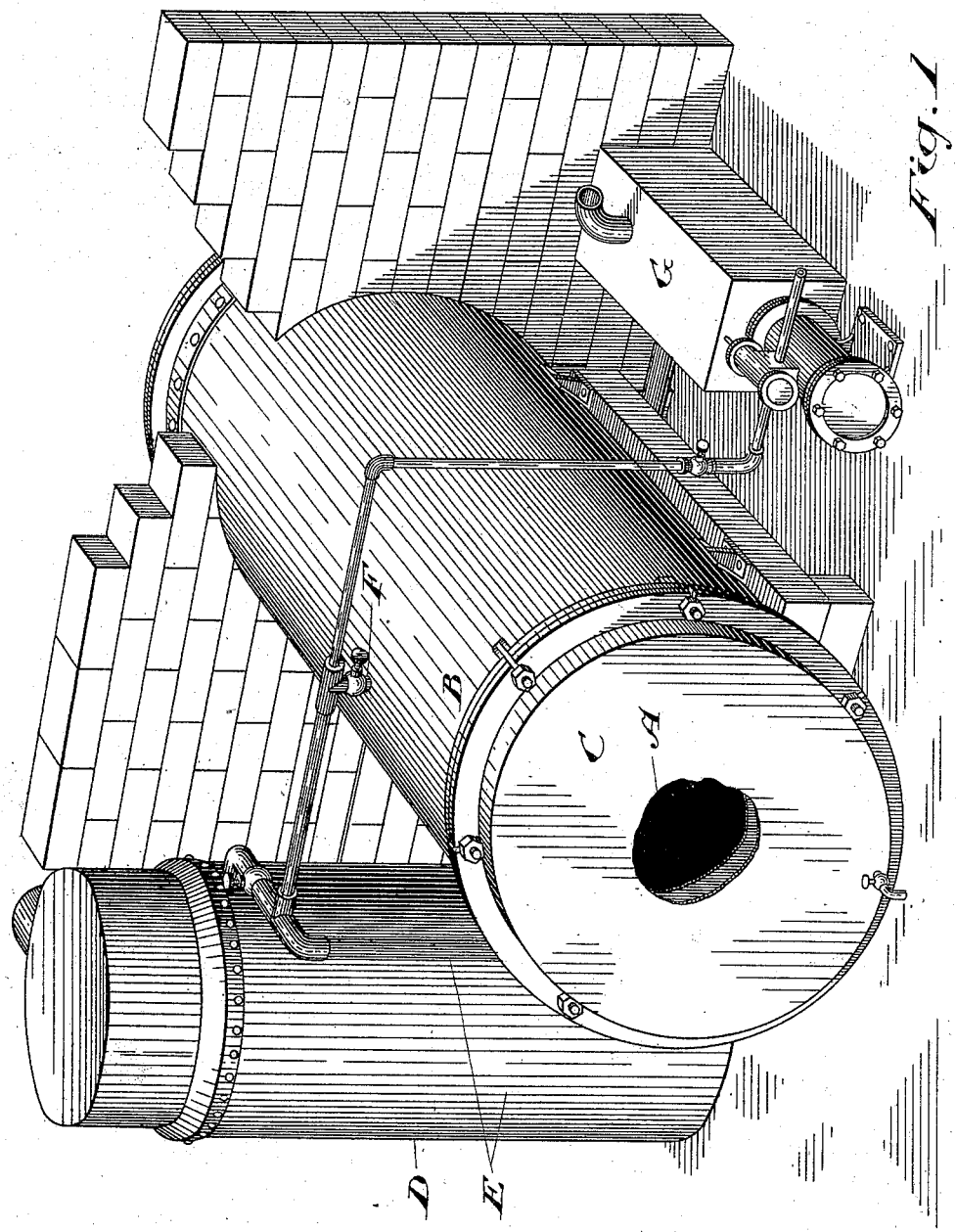
Figure 2:
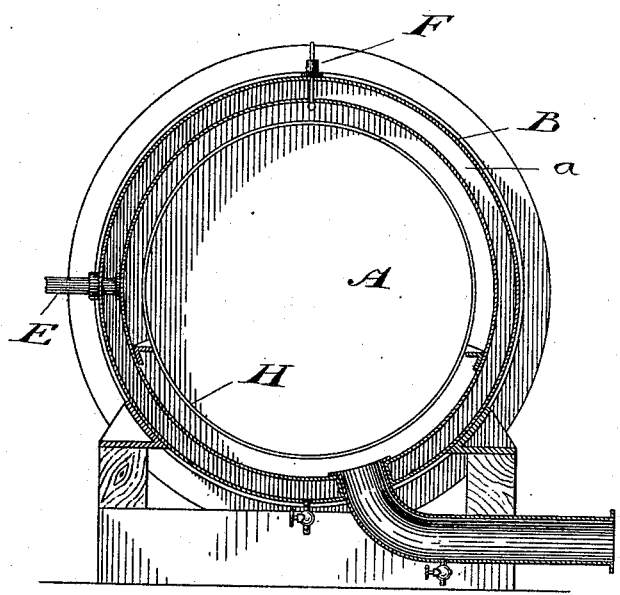
Figure 3:
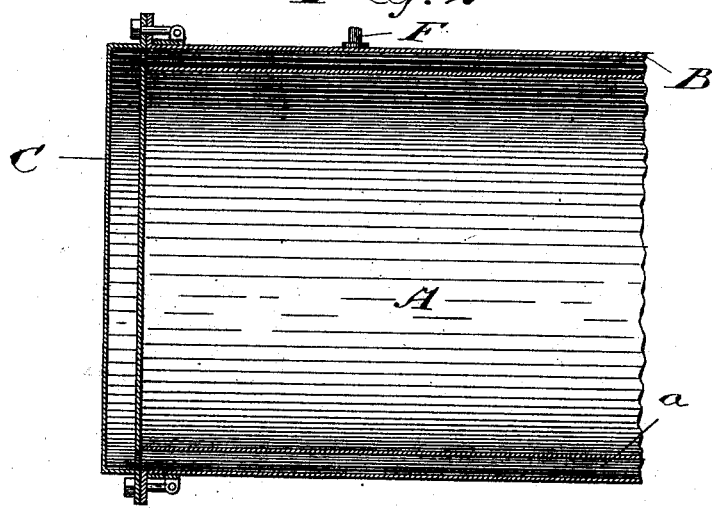

Figure 1, is a perspective view of my improved apparatus parts being broken away to expose its interior construction. Fig. 2, is a cross-section of the disinfecting chamber. Fig. 3, is a longitudinal section of one end of the disinfecting chamber.

In the drawings, A, represents a vessel or chamber, preferably cylindrical in form.

B, is an outer casing surrounding the vessel A, a space $a$, being left between the two. At each end of the vessel A, I provide a cover C, having simple fastening devices and designed to hermetically seal the ends of the vessel A, and the space $a$.

D, is a steam boiler.

E, is a pipe leading from the steam boiler D, to the interior of the vessel A, and F, is a pipe leading from the boiler A, to the space $a$, a corresponding space being formed in each cover C, so that the steam admitted into one space shall enter and fill all the spaces which surround the body and ends of the vessel.

G, is an air pump provided with a pipe leading to the interior of the vessel A. All the pipes are provided with suitable stop cocks, and drain pipes with suitable cocks are provided wherever necessary.

I prefer to place the vessel A, so that its ends shall be in separate chambers in order that the material, after it has been carried through the apparatus and disinfected, may be completely isolated from the material waiting to be disinfected.

H, is a cage suitably constructed to contain the material to be disinfected. This cage is preferably carried on a truck in order that it may be readily moved into and moved out of the vessel or chamber A.

The operation of my apparatus is as follows:—I place the material to be disinfected in the cage H, which is pushed into the vessel A, when the cover is hermetically sealed in position. Steam is then admitted into the space $a$, and when the chamber or vessel A, is heated to a high temperature of not less than 212° (but preferably considerably higher), the air pump G, is started and as perfect a vacuum as is possible is made in the vessel A. Steam is then admitted into the vessel or chamber A, and retained there under pressure for a half an hour, more or less, according to the nature of the article being disinfected. The steam is then cut off and the air pump G, again started and as perfect a vacuum as is possible is once more created in the chamber or vessel A. The cover C, on the end opposite to that through which the articles were placed in the chamber or vessel A, is removed and the cage H, is withdrawn from the vessel or chamber A, into an apartment separated from the compartment containing the infected material.

In some cases it is advisable to destroy the bacilli taken from the infected material. To accomplish this, I direct the exhaust from the vessel containing the material into the firebox of the boiler from which the steam is obtained.

What I claim as my invention is—

A disinfecting apparatus comprising an inner cylinder, an outer cylinder surounding the same with an annular jacket chamber between, which opens at the ends of the cylinders, the steam pipes leading to the annular chamber and the inner cylinder, the exhaust pipe leading from the inner cylinder, and the removable double heads for the ends of the cylinders having inner and outer walls, the said heads being adapted to extend across both the inner cylinder and the jacket chamber and having openings in their inner walls whereby when the heads are fixed in place their interior spaces are thrown into communication with the jacket of the cylinders, substantially as described.

Toronto, September 5, 1892.

BERNARD McEVOY.

In presence of—
ARTHUR McEVOY,
A. M. NEFF.